(12) United States Patent
Sarma et al.

(10) Patent No.: US 9,175,108 B2
(45) Date of Patent: Nov. 3, 2015

(54) PROCESS FOR SYNTHESIS OF ETHYLENE POLYMERS

(71) Applicant: RELIANCE INDUSTRIES LIMITED, Mumbai, Maharashtra (IN)

(72) Inventors: Krishna Renganath Sarma, Gujarat (IN); Ajit Behari Mathur, Gujarat (IN); Rakshvir Jasra, Gujarat (IN); Sudhakar Padmanabhan, Tamil Nadu (IN); Shashikant, Gujarat (IN); Viralkumar Patel, Gujarat (IN)

(73) Assignee: RELIANCE INDUSTRIES LIMITED, Mumbai (IN)

( * ) Notice: Subject to any disclaimer, the term of this patent is extended or adjusted under 35 U.S.C. 154(b) by 0 days.

(21) Appl. No.: 14/250,214

(22) Filed: Apr. 10, 2014

(65) Prior Publication Data

US 2014/0221588 A1 Aug. 7, 2014

Related U.S. Application Data

(63) Continuation of application No. PCT/IN2012/000646, filed on Sep. 27, 2012.

(30) Foreign Application Priority Data

Oct. 10, 2011 (IN) .......................... 2862/MUM/2011

(51) Int. Cl.
C08F 4/76 (2006.01)
C08F 10/02 (2006.01)
C08F 4/64 (2006.01)

(52) U.S. Cl.
CPC . *C08F 4/76* (2013.01); *C08F 10/02* (2013.01); *C08F 4/64048* (2013.01)

(58) Field of Classification Search
CPC .. C08F 10/02; C08F 2500/01; C08F 4/60048; C08F 4/62048
USPC ......................................... 526/352, 172, 161
See application file for complete search history.

(56) References Cited

U.S. PATENT DOCUMENTS

| | | | |
|---|---|---|---|
| 5,986,029 A | 11/1999 | van Beek et al. | |
| 6,562,930 B2 | 5/2003 | Coates et al. | |
| 6,787,624 B2 | 9/2004 | Coates et al. | |
| 6,875,718 B2 | 4/2005 | Fujita et al. | |
| 7,119,154 B2 | 10/2006 | Coates et al. | |
| 7,671,159 B2 * | 3/2010 | Rastogi et al. | 526/352 |
| 2003/0060584 A1 | 3/2003 | Coates et al. | |
| 2003/0096927 A1 | 5/2003 | Chen et al. | |
| 2010/0087929 A1 | 4/2010 | Rastogi et al. | |

FOREIGN PATENT DOCUMENTS

| | | |
|---|---|---|
| CN | 1651472 A | 8/2005 |
| CN | 1850869 A | 10/2006 |
| EP | 1 308 255 A1 | 5/2003 |
| EP | 0 874 005 B1 | 7/2003 |
| EP | 1 669 376 B1 | 5/2008 |
| JP | 2000-63416 A | 2/2000 |
| WO | 01/05231 A2 | 1/2001 |
| WO | 2006/136323 A1 | 12/2006 |
| WO | 2009/091334 A1 | 7/2009 |
| WO | 2009/109632 A1 | 9/2009 |
| WO | 2009/127410 A1 | 10/2009 |
| WO | 2009/133060 A1 | 11/2009 |

(Continued)

OTHER PUBLICATIONS

Ailianou, A.; Kornfield, J.A.; Forte, G.; Ronca, S.; Rastogi, S. Polym. Preprints 2011, 52(1), Mar. 27-31.*

(Continued)

*Primary Examiner* — Rip A Lee
(74) *Attorney, Agent, or Firm* — Collard & Roe, P.C.

(57) ABSTRACT

The present invention relates to a non-cryogenic process for the large scale synthesis of disentangled ultra high molecular weight polyethylene (DUHMWPE) polymers. The process comprises of the following steps:

a. mixing FI catalyst of formula I

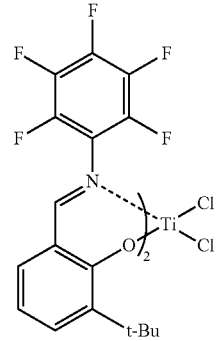

Formula I with a hydrocarbon solvent containing poly-methyl aluminoxane (P-MAO) co-catalyst in a vessel under stirring before polymerization or directly in the polymerization vessel at a temperature ranging between 25° C. and 29° C. under a dry Nitrogen atmosphere; and lower concentration of co-catalyst resulting in the associated benefits as described earlier in the claims and descriptions.

b. pressurizing ethylene in the polymerization vessel and polymerizing ethylene in a solution or a suspension, continuously or batch wise, in one or more stages at a temperature is in the range of 30° C. to 50° C.

14 Claims, 3 Drawing Sheets

(56) References Cited

FOREIGN PATENT DOCUMENTS

| WO | 2009/153318 | A1 | | 12/2009 | | |
|---|---|---|---|---|---|---|
| WO | 2010/003971 | A1 | | 1/2010 | | |
| WO | 2010/007062 | A1 | | 1/2010 | | |
| WO | WO 2010/027728 | A1 | * | 3/2010 | ................ | C08F 4/64 |
| WO | WO 2010/139720 | A1 | * | 12/2010 | | |

OTHER PUBLICATIONS

Pandey, A.; Champouret, Y.; Rastogi, S. Macromolecules 2011, 44, 4952-4960.*

International Search Report of PCT/IN2012/000646 mailed Oct. 21, 2013.

* cited by examiner

# PROCESS FOR SYNTHESIS OF ETHYLENE POLYMERS

CROSS REFERENCE TO RELATED APPLICATIONS

This application is the continuation of PCT/IN2012/000646 filed on Sep. 27, 2012, which claims priority under 35 U.S.C. §119 of Indian Application No. 2862/MUM/2011 filed on Oct. 10, 2011, the disclosures of which are incorporated by reference.

FIELD OF THE INVENTION

The present invention relates to synthesis of polyethylene. Particularly, the present invention relates to synthesis of disentangled ultra high molecular weight polyethylene (DU-HMWPE).

BACKGROUND

Ultra high molecular weight polyethylene (UHMWPE) is a type of polyolefin. It is made up of extremely long chains of polyethylene. It derives its strength largely from the length of each individual molecule (chain). Van der Waals bonds between the molecules are relatively weak for each atom of overlap between the molecules, but because the molecules are very long, large overlaps can exist, adding up to the ability to carry larger shear forces from molecule to molecule. Each chain is bonded to the others with so many Van der Waals bonds that the whole of the inter-molecule strength is high.

The polar groups present in most polymers easily bond with water. UHMWPE does not absorb water readily as polar groups are absent in it which makes its bonding with other polymers difficult. Therefore, skin does not interact with it strongly, making the UHMWPE fiber surface feel slippery. As UHMWPE does not contain chemical groups such as esters, amides or hydroxylic groups, that are susceptible to attack from aggressive agents, it is very resistant to water, moisture, most chemicals, UV radiation, and micro-organisms. UHMWPE are immune to aromatic stacking interactions caused in contact with aromatic solvents to which aromatic polymers are often susceptible.

The UHMWPE results in excellent properties such as a high abrasion resistance, high impact resistance and high melt viscosity. Hence it is used in applications where the lower molecular weight grades fail.

Existing Knowledge:

The synthesis of UHMWPE using conventional Zeigler Natta catalysts result in high entanglement of the chains because of the drastic reaction conditions used in such reactions. It is hence imperative that for achieving disentanglement of the polymer chains single site catalysts are needed which are highly active and exhibit living nature under milder process conditions.

The living nature of the catalyst systems is exemplified in the following patents of Fujita et al, Mitsui chemicals: U.S. Pat. No. 6,875,718; EP 0 874 005; PCT Int. Appl. WO 2001005231.

Geoffrey W Coates et al have also shown the living nature of such related catalyst systems vide U.S. Pat. Nos. 6,562,930; 6,787,624; 7,119,154 for the homo and copolymerization of propylene.

Sanjay Rastogi has also used such catalyst systems utilising its living nature to demonstrate that the UHMWPE produced was of the disentangled nature (EP 1 308 255 dated 2003). His recent US patent application 2010/0087929 demonstrates the usage of such disentangled UHMWPE for mouldable shaped parts with advantages for use in medical applications.

Teijin Aramid, N L, used such disentangled UHMWPE and developed suitable machinery to process same using solid state processing techniques followed by drawing into tapes and fibers as exemplified in the following patent applications. WO 2009/153318, WO 2010/003971, WO 2009/133060, WO 2009/109632, WO 2010/007062, WO 2006/136323, WO 2009/133060

WO2009127410A1 describes a method of preparation of a ultra high molecular weight polyethylene (hereinafter mentioned as "UHMWPE") of molecular weight between 1000000 g/mol and 10000000 g/mol; by using a titanium based catalyst and a co-catalyst triethylaluminium or tri-isobutylaluminium which has a molar ratio of magnesium compound:titanium compound lower than 3:1.

EP874005B1 deals with olefin polymerization catalysts such as a transition metal complex and organoaluminum oxy-compound as a co-catalyst and processes for synthesizing polyethylene.

U.S. Pat. No. 5,986,029 deals with a process for synthesis of HDPE, LDPE, LLDPE and co-polymers of ethylene using a new catalyst transition metal complex like $C_5Me(CH_2)_2NMe_2TiCl_2$ and its analogues and methyl alumoxane co-catalyst system.

US2003096927 deals with the synthesis of Polyethylene and its co-polymer using catalyst Bis—schiff base ligand with a cyclopentadienyl metal chloride where the metal is titanium or zirconium or hafnium and a co-catalyst methyl alumoxane.

JP2000063416 deals with the snythesis of polymers with a wide molecular weight distribution using a titanium catalyst and organoaluminumoxy compound as a co-catalyst.

CN1651472 deals with a catalyst of a IV B-family match of Schiff base containing oxyl, which has a catalytic activity for polymerising ethylene.

CN1850869 disclose a beta-ketimine vanadium alkene polymerization catalyst and the manufacture method and the application of ethylene polymerising, ethylene and norborene polymerizing, ethylene and alpha-alkene or norborene co-polymerization.

WO09091334 deals with the synthesis of self assembled catalyst which is a Li or Na salt of Schiff base made from (an aniline and di-aldehyde/di-ketone, tri-aldehyde/tri-ketone or tetrakis-aldehyde/tetrakis-ketone) with transition metal and a co-catalyst like organo-aluminium compound and its use for the synthesis of polyolefins of low molecular weight to ultra high molecular weight (3000 to 3000000).

U.S. Pat. No. 6,562,930 is directed to bis(salicylaldiminato)titanium complex catalysts, and highly syndiotactic polypropylene makable therewith by a chain-end control mechanism, and block copolymers containing the syndiotactic polypropylene and poly(ethylene-co-propylene) and/or poly(alpha-olefin-co-propylene), as well as to living olefin polymers and to olefin terminated to oligomers and polymers and to methods of making syndiotactic polypropylene, block copolymers and olefin-terminated oligomers and polymers from propylene.

EP1669376 relates to a dual catalyst system on the same support which is a phosphinimine ligand supported catalyst and aluminium complex with a hindered phenol as co-catalyst suitable for the polymerization of bimodal polyolefins (e.g. polyethylene) having reverse or partial reverse comonomer incorporation.

US2003060584 is directed to a process for synthesis of syndiotactic polypropylene and its block co-polymers using bis(salicylaldiminato)titanium complex and methyl alumoxane.

The state of the art discloses processes for the manufacture of polyolefins including UHMWPE. However, the UHMWPE suffers from the drawback that it can be processed only at high temperatures. Because of the high molecular weight and high melt viscosity of UHMWPE, it requires specialized processing methods like compression moulding and ram extrusion. Furthermore, processing of UHMWPE for making fibers for using in bullet proof vests involves high temperature gel spinning of polymer solutions which are energy intensive. There is a need to synthesize disentangled form of UHMWPE which can be processed at lower temperatures and can be used for a variety of purposes. The existing methods for synthesis of DUHMWPE makes use of cryogenic units for maintaining zero to sub-zero temperatures to carry out the reaction. Therefore, the synthesis of a DUHMWPE in a simple and efficient manner is a challenge. Thus, there remains a need for developing an efficient, economically viable and industrially feasible process for the synthesis of DUHMWPE.

OBJECTS OF THE INVENTION

An object of the present invention is to provide a process for synthesis of DUHMWPE under non-cryogenic conditions.

Another object of the present invention is to synthesize DUHMWPE in larger batch sizes in the existing UHMWPE facilities thereby making the process economical.

Yet another object of the present invention is to provide a process wherein, there is desired control over the reaction kinetics by optimal catalyst, co-catalyst ratio.

A further object of the present invention is to provide a process which enables a quantitative transfer of the polymer easily from the polymerization vessel by using an optimal ratio of the catalyst and co-catalyst.

Still further object of the present invention is to provide a catalyst and co-catalyst system to lower the exotherm during polymerization to maintain good morphology and control the molar mass of the polymer.

SUMMARY OF THE INVENTION

The present disclosure provides a non-cryogenic process for synthesis of DUHMWPE in a conventional UHMWPE facility using an optimal ratio of FI catalyst and co-catalyst system under relatively milder process conditions. The structure of the FI catalyst employed in the process of the present invention is as follows:

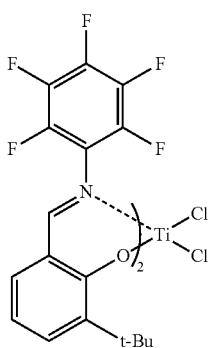

Formula I

In particular, the process of the present invention involves the following steps:
a. mixing FI catalyst of formula I with a hydrocarbon solvent containing poly-methyl aluminoxane (P-MAO) co-catalyst in a vessel under stirring before the polymerization or directly in the polymerization vessel at a temperature ranging between 25° C. and 29° C. under a dry Nitrogen atmosphere; and
b. pressurizing ethylene in the polymerization vessel and polymerizing ethylene in a solution or a suspension, continuously or batch wise, in one or more stages at a temperature in the range of 30° C. to 50° C.

Typically, the synthesis of DUHMWPE in accordance with the process of the present invention is carried in a conventional UHMWPE facilities.

Typically, the polymerization reaction is carried out in a continuous or a batch mode, preferably in a batch mode.

Typically, the ethylene pressure used for the reaction is maintained in the range of 0.3 to 50 bars.

Preferably, the range of ethylene pressure used for the polymerization reaction is between 1 to 10 bars and more specifically 1.5 bars and 2.5 bars.

Typically, the range of the optimal ratio of the co-catalyst and catalyst used in the polymerization reaction for the synthesis of DUHMWPE is in the range of 10 to 2000 and more specifically 100 to 200.

Typically, the catalyst concentration employed for the polymerization reaction ranges between 0.013 mmol of Ti and 0.021 mmol of Ti.

Typically, the hydrocarbon solvent used in the process is at least one selected from the group consisting of hexane, cyclohexane, toluene, heptane, octane, iso-octane decane, varsol and mixtures thereof.

Preferably, the hydrocarbon solvent used is varsol which is a mixture of aliphatic hydrocarbons.

Typically, the amount of hydrocarbon solvent used in the reaction ranges between 0.45 liters and 0.55 liters.

Typically, the temperature maintained for the polymerization reaction is in the range of 43° C. to 47° C.

Typically, in accordance with the process of the present invention, the agitation speed of the polymerization vessel ranges between 400 rpm and 800 rpm.

In accordance with the process of the present invention, time required for achieving a molecular weight of 5 million g/mole of the polymer is in the range of 15 minutes to 20 minutes.

Typically, the time required for achieving molecular weight of greater than 12 million g/mole of the polymer ranges between 55 minutes and 65 minutes.

Typically, the polymerization reaction in accordance with the process of the present invention is carried in a metal reactor.

Typically, in accordance with the process of the present invention, the yield of polymer is between 0.5 kg/g and 5.0 kg/g of catalyst with molecular weight ranging between 0.08 and 15.0 million g/mole of the polymer.

Typically, the bulk density of the polymer obtained in accordance with the process of the present invention ranges between 0.055 g/cm$^3$ and 0.08 g/cm$^3$.

Typically, the crystallinity of the polymer obtained in accordance with the process of the present invention is around 90-95% as measured by XRD.

Typically, the particle density of the polymer obtained in accordance with the process of the present invention is up to 0.97 g/cm$^3$.

In accordance with the present invention, there is provided DUHMWPE characterized by crystallinity of 90-95% as measured by XRD and with a particle density up to 0.97 g/cm$^3$.

DETAILED DESCRIPTION OF THE INVENTION

Figure 1:
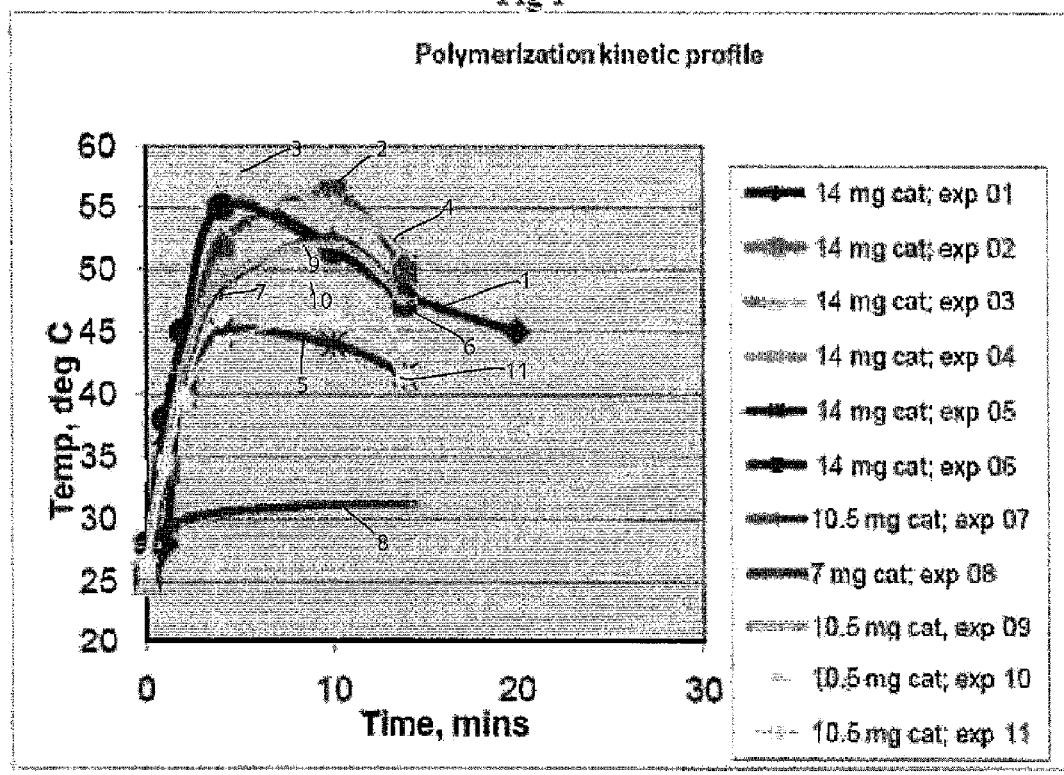
FIG. 1 illustrates polymerization kinetics monitored over time for achieving optimum catalyst concentration for the polymerization reaction for examples 1-11 mentioned in Table 1

In accordance with the present invention, there is provided a non-cryogenic process for synthesis of DUHMWPE in a conventional UHMWPE facility using an optimal ratio of FI catalyst and co-catalyst system under relatively milder process conditions.

The process of the present invention comprises the following steps:

a. mixing FI catalyst of formula I with a hydrocarbon solvent containing poly-methyl aluminoxane (P-MAO) co-catalyst in a vessel under stirring before the polymerization or directly in the polymerization vessel at a temperature ranging between 25° C. and 29° C. under a dry Nitrogen atmosphere; and b. pressurizing ethylene in a polymerization vessel and polymerizing ethylene in a solution or a suspension, continuously or batch wise, in one or more stages at a temperature in the range of 30° C. to 50° C.

Preferably, the temperature range is in the range of 43° C. to 47° C. and still preferably, the temperature range is between 44° C. and 45° C.

In accordance with one of the embodiments of the present invention, the ethylene pressure used for the polymerization reaction is in the range of 0.3 bars and 50 bars.

Preferably, the range of ethylene pressure used for the polymerization reaction is between 1 to 10 bars and more specifically 1.5 bars and 2.5 bars.

The molar mass of the polymer is regulated by controlling the kinetics of the polymerization taking advantage of the living characteristics of the catalyst.

Typically, in accordance with the process of the present invention, the agitation speed of the polymerization vessel is maintained between 400 and 800 rpm.

Preferably, the agitation speed of the polymerization vessel is maintained between 500 rpm and 700 rpm and still preferably between 500 rpm and 600 rpm.

In accordance with another aspect of the present invention, there is provided a living polymerization system comprising FI catalyst of formula I and poly-methyl aluminoxane (P-MAO) co-catalyst system.

The living polymerization system employed in the present invention results in synthesis of DUHMWPE of desired molecular weight. The molecular weight of DUHMWPE synthesized in accordance with the present invention varies according with the time for which the reaction is carried out.

Typically, the preferred time for achieving a molecular weight of 5 million g/mole is between 15 minutes and 20 minutes.

Preferably, the time is between 16 minutes and 18 minutes and still preferably, around 17 minutes.

In accordance with one of the embodiments of the present invention, the time required for achieving molecular weight of greater than 12 million g/mole of the polymer ranges between 55 minutes and 65 minutes.

In accordance with the present invention, the solvent employed for the polymerization reaction is a hydrocarbon solvent.

The hydrocarbon solvent used for the reaction facilitates efficient removal of heat combined with enhanced operational safety. Furthermore, it also keeps the polymer formed in suspension, allowing it to settle down quickly facilitating ease of removal from the vessel. Polymerization reaction carried out in other solvents results in the floating of the polymer.

Typically the hydrocarbon solvent is at least one selected from the group consisting of hexane, cyclohexane, toluene, heptane, octane, iso-octane, decane, varsol and mixtures thereof.

Preferably, the hydrocarbon solvent used is varsol which is a mixture of aliphatic hydrocarbons.

Typically, the amount of hydrocarbon solvent used in the reaction ranges between 0.45 liters and 0.55 liters.

In accordance with the present invention, an optimal ratio of the co-catalyst and catalyst is used in the polymerization reaction for the synthesis of DUHMWPE.

Typically, the co-catalyst/catalyst molar ratio used for the polymerization reaction is in the range of 10 to 2000 and more specifically 100 to 200.

Typically, the catalyst concentration employed for the polymerization reaction ranges between 0.013 mmol of Ti and 0.021 mmol of Ti.

Preferably, the catalyst concentration used in the process of the present invention ranges between 0.016 mmol of Ti and 0.017 mmol of Ti.

In accordance with the present invention, the polymerization reaction is carried out in a continuous or a batch mode.

Typically, the polymerization reaction in accordance with the process of the present invention is carried out in a batch mode.

In accordance with one of the embodiments of the present invention, the polymerization vessel used for the synthesis of DUHMWPE is a metal reactor like Buchi, SS316 to quench the heat of polymerization.

Typically, in accordance with the process of the present invention, the yield of polymer is between 0.5 kg/g and 5.0 kg/g of catalyst with molecular weight ranging between 0.08 and 15.0 million g/mole of the polymer.

Typically, the bulk density of the polymer obtained in accordance with the process of the present invention is between 0.055 g/cc and 0.08 g/cc.

Typically, the crystallinity of the polymer obtained in accordance with the process of the present invention is around 90-95% as measured by XRD with particle density up to 0.97 g/cm$^3$.

The present invention will now be described with the help of following non-limiting examples.

EXAMPLES

1) Optimum Catalyst Concentration Under the Operating Conditions

A 1.0 dm$^3$ reactor was charged with 500 cm$^3$ of varsol containing requisite amount of P-MAO and the catalyst resulting in a molar ratio of about 100 to 200. The initial reactor temperature was around 25° C. and kept agitated at 500 rpm. The reactor was then pressurized with 2 bar of ethylene and maintained at same pressure to replenish the ethylene consumed. The polymerization kinetics was monitored over time. The respective individual temperature profiles can be seen in FIG. 1. These examples were aimed to arrive at the optimum catalyst concentration under the operating conditions so that the polymerization exotherm did not cross 45° C. preventing fusion of the individual polymer molecules. The experiments also served to freeze the duration of polymerization for achieving the desired molecular weight. Conventional experiments which serve as comparison are normally carried out at a temperature of 0° C. to −10° C. at atmospheric pressure of ethylene and thus the rate is abysmally slow; making the process of present invention much superior as regards product economics, without sacrificing on the polymer characteristics, like molecular weight, morphology and bulk density.

Example 5 was deliberately carried out at ethylene pressure of 1 bar to visualize the drop in rate The results of the polymerization are shown below in Table 1.

TABLE 1 Polymerization experiments using 1.0 dm$^3$ reactor (Buchi glasuster polyclave), 0.5 dm$^3$ of varsol, 2 bar of ethylene ($C_2$), 500 rpm agitation, P-MAO/catalyst molar ratio 150.

Table 2. Polymerization experiments using 1.0 dm$^3$ SS316 metal Buchi reactor, 0.5 dm$^3$ of varsol, 2 bar of ethylene ($C_2$), 500 rpm agitation, P-MAO/catalyst molar ratio 150.

TABLE 2

| | SS316 1L metal reactor (Buchi) | | |
|---|---|---|---|
| | Exp. No. | | |
| | 12 | 13 | 14 |
| Cat conc. (mg) | 13 | 13 | 13 |
| Time (min) | 18 | 15 | 17 |
| Yield (g) | 32 | 28 | 30 |
| Yield (g/g of cat) | 2406 | 2154 | 2273 |
| Yield (g/mmol of Ti) | 1933 | 1730 | 1826 |
| RSV (dl/g) ASTM-D4020 | 28.8 | 27.7 | 28.4 |
| MW (Millions) ASTM-D4020 | 5.4 | 5.1 | 5.3 |

TABLE 1

| Exp. No. | 1 | 2 | 3 | 4 | 5 | 6 | 7 | 8 | 9 | 10 | 11 |
|---|---|---|---|---|---|---|---|---|---|---|---|
| Cat conc. (mg) | 14 | 14 | 14 | 14 | 14 | 14 | 10.5 | 7 | 10.5 | 10.5 | 10.6 |
| Time (min) | 20 | 15 | 10 | 15 | 15 | 15 | 15 | 15 | 15 | 15 | 15 |
| Yield (g) | 35 | 30 | 27 | 30 | 23 | 29 | 24.5 | 5 | 24 | 24 | 21 |
| Yield (g/g of cat) | 2500 | 2143 | 1929 | 2143 | 1643 | 2071 | 2333 | 714 | 2286 | 2286 | 2000 |
| Yield (g/mmol of Ti) | 2008 | 1722 | 1549 | 1722 | 1320 | 1664 | 1875 | 574 | 1836 | 1836 | 1607 |
| RSV (dl/g) ASTM-D4020 | 30.4 | 28.4 | 20.3 | 27.7 | 31.1 | 25 | 27.4 | 26 | 28.8 | 28.4 | 27.7 |
| MW (Millions) ASTM-D4020 | 5.7 | 5.3 | 3.3 | 5.1 | 5.9 | 4.4 | 5.0 | 4.7 | 5.4 | 5.3 | 5.1 |

2) Controlled Polymerization Exotherm Below 45° C.

Figure 2:
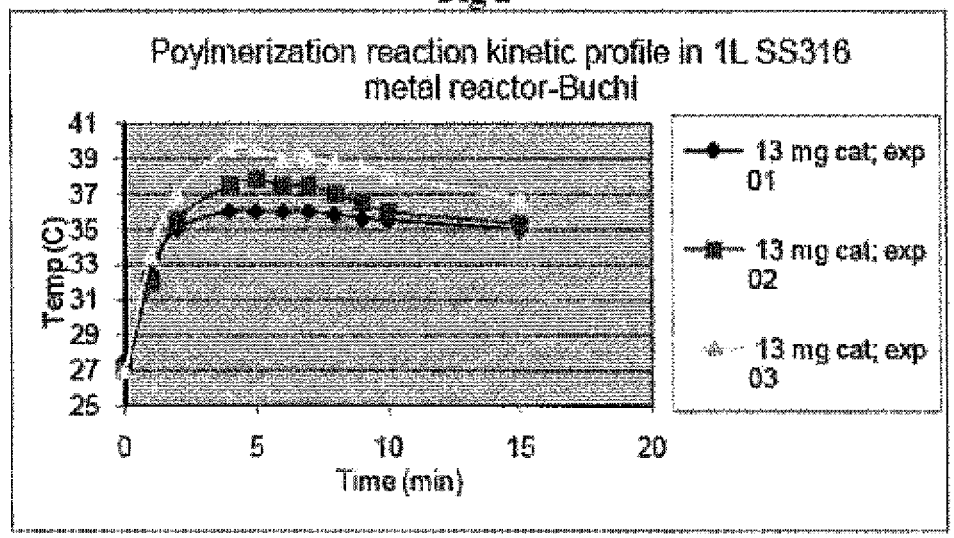
FIG. 2 illustrates polymerization reaction kinetic profile in 1 L SS316 metal Buchi reactor dealing with control of the polymerization exotherm below 45° C. monitored over time for examples 12-14 mentioned in Table 2.

A 1.0 dm$^3$ metal reactor (Buchi, SS316) was charged with 500 cm$^3$ of varsol containing requisite amount of P-MAO and the catalyst resulting in a molar ratio of about 100 to 200. The initial reactor temperature was around 25° C. and kept agitated at 500 rpm. The reactor was then pressurized with 2 bar of ethylene and maintained at same pressure to replenish the ethylene consumed. The polymerization kinetics was monitored over time. The respective individual temperature profiles can be seen in FIG. 2. These examples were aimed to illustrate how the polymerization exotherm could be controlled below 45° C. under more or less identical process conditions due to effective heat removal in a metal reactor thus preventing fusion of the individual polymer molecules. The experiments also served to freeze the duration of polymerization for achieving the desired molecular weight. Conventional experiments which serve as comparison are normally carried out at a temperature of 0° C. to −10° C. at atmospheric pressure of ethylene and thus the rate is abysmally slow; making the process of present invention much superior as regards product economics, without sacrificing on the polymer characteristics, like molecular weight, morphology and bulk density.

The results of the polymerization are shown below in Table 2.

3) Polymerization Reaction in SS316 Metal Buchi Reactor

Figure 3:
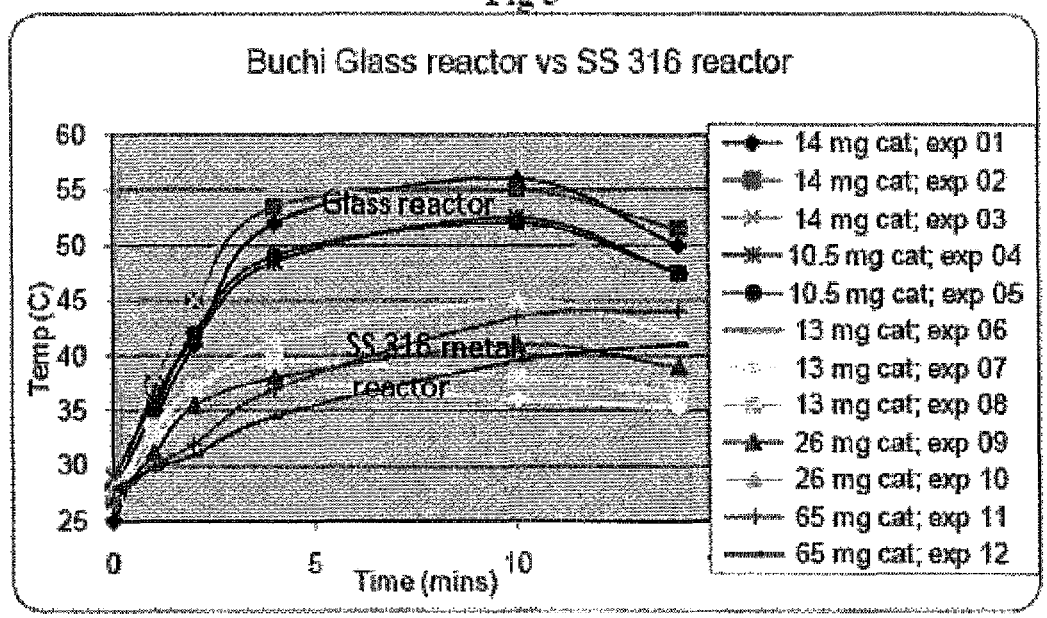
FIG. 3 illustrates polymerization exotherm dealing with quenching of polymerization exotherm in a metal reactor Buchi, SS316 from a temperature range of 50° C.-55° C. to 40° C.-45° C. in comparison to the glass reactor for examples 15-26 mentioned in Table 3.

Examples 15 to 19 have been performed in a Buchi glass reactor and the catalyst concentrations in examples 18 and 19 have been reduced to lower the exotherm during polymerization as can be seen in FIG. 3. Examples 20 to 26 have been performed in a SS316 metal Buchi reactor of capacities 1.0 dm$^3$, 2.0 dm$^3$ and 5.0 dm$^3$ with proportionate increase of the catalyst, co-catalyst and polymerization medium. The results in Table 3 and FIG. 3 clearly illustrate how the polymerization exotherm has been quenched from a temperature range between 50° C.-55° C. to 40° C.-45° C. in comparison to the glass reactor. This also resulted in improved polymer morphology. The reactors were charged with requisite amount of varsol containing requisite amount of P-MAO and the catalyst resulting in a molar ratio of about 100 to 200. The initial reactor temperature was around 25° C. and kept agitated at 500 rpm. The reactor was then pressurized with 2 bar of ethylene and maintained at same pressure to replenish the ethylene consumed. The polymerization kinetics was monitored over time. The respective individual temperature profiles can be seen in FIG. 3. These examples were aimed to illustrate the difference between the MOC of the reactor during polymerization scale up process and how the polymerization exotherm could be controlled below 45° C. under more or less identical process conditions due to effective heat removal in a metal reactor thus preventing fusion of the individual polymer molecules. The experiments also served to check the R&R of the polymerization for achieving the desired molecular weight. Conventional experiments which serve as comparison are normally carried out at a temperature of 0° C. to −10° C. at atmospheric pressure of ethylene and thus the rate is abysmally slow; making the process of present invention much superior as regards product economics, without sacrificing on the polymer characteristics, like molecular weight, morphology and bulk density.

The results of the polymerization are shown below in Table 3. RSV and Molecular weight are based on ASTM-D4020.

TABLE 3

| Exp. No. | 15 | 16 | 17 | 18 | 19 | 20 | 21 | 22 | 23 | 24 | 25 | 26 |
|---|---|---|---|---|---|---|---|---|---|---|---|---|
| Cat concn (mg) | 14 | 14 | 14 | 10.5 | 10.5 | 13 | 13 | 13 | 26 | 26 | 65 | 65 |
| Time, min | 15 | 15 | 15 | 15 | 15 | 18 | 15 | 15 | 15 | 15 | 15 | 15 |
| Yield, g | 30 | 30 | 29 | 24.5 | 24 | 32 | 28 | 30 | 56 | 57 | 107 | 102 |
| Yield, g/g of cat | 2143 | 2143 | 2071 | 2333 | 2286 | 2406 | 2154 | 2273 | 2154 | 2192 | 1574 | 1500 |
| Yield, g/mmol of Ti | 1722 | 1722 | 1664 | 1875 | 1836 | 1933 | 1730 | 1826 | 1730 | 1761 | 1264 | 1205 |
| RSV, dl/g | 28.4 | 27.7 | 27.4 | 27.4 | 28.8 | 28.8 | 27.7 | 28.4 | 25 | 25.7 | 27 | 27.4 |
| MW, M | 5.3 | 5.1 | 5.0 | 5.0 | 5.4 | 5.4 | 5.1 | 5.3 | 4.4 | 4.6 | 4.9 | 5.0 |

4) Molecular Weight of the Polymer Increases with Time

Table 4 provides polymerization experiments performed under different conditions for illustration. The bulk density of the polymer obtained was between 0.055 to 0.08 g/cc. Molecular weight obtained was over a wide range to suit the requirement. Providing more time resulted in molecular weight greater than 12 M g/mole since the phenomenon was of a living nature. RSV and molecular weight were based on ASTM D-4020.

TABLE 4

| Exp. No. | 27 | 28 | 29 | 30 | 31 | 32 | 33 |
|---|---|---|---|---|---|---|---|
| Cat. Concn.(mg) | 220 | 14 | 11 | 11 | 11 | 12 | 14 |
| Time, min | 90 | 20 | 60 | 10 | 60 | 15 | 60 |
| Reactor | 19 L, SS316 | 1 L, glass | 1 L, glass | 1 L, glass | 1 L, glass | 1 L, glass | 1 L, glass |
| P-MAO/catalyst (molar ratio) | 1844 | 175 | 220 | 204 | 204 | 218 | 204 |
| Medium | Varsol | hexane | Toluene | Varsol | Varsol | Varsol | Varsol |
| Polymerization temperature ° C. | 40 ± 1° C. | 38 ± 1° C. | 37 ± 1° C. | 42 ± 1° C. | 32 ± 1° C. | 49 ± 1° C. | 34 ± 1° C. |
| Ethylene pressure, bars | 2 | 2 | 1 | 1 | 0.3 | 2 (containing 0.2 bar $H_2$) | 2 |
| Yield, g | 1050 | 33 | 17 | 14.5 | 7 | 19.8 | 58 |
| Yield, g/g of cat | 4773 | 2357 | 1545 | 1318 | 636 | 1650 | 4143 |
| Yield, g/mmol of Ti | 3834 | 1894 | 1242 | 1059 | 511 | 1326 | 3328 |
| RSV, dl/g | 48 | 35.8 | 41.8 | 19.6 | 15.5 | 1.35 | 52 |
| MW, M | 10.8 | 7.2 | 8.9 | 3.1 | 2.3 | 0.08 | 12.1 |

5) Scale Up of the Polymerization Reaction

Polymerization experiments were also performed in a 19.0 dm³ SS316 metal Buchi reactor with proportionate quantity of varsol, 2 bar of ethylene ($C_2$), 500 rpm agitation, P-MAO/catalyst molar ratio 150 to 200 as part of scale up of the process. The productivity was closer and some what better than the 5.0 dm³ reactor and the polymer characteristics like morphology, molecular weight, crystallinity, bulk density etc were comparable. Trials in a 90 dm³ reactor were also comparable and resulted in 2 Kg of the material, a substantial quantity physically since the bulk density of the product was only around 0.055 to 0.08 g/cm³.

Analysis of the Polymer Product of the Present Invention

The crystallinity of the polymer as measured by XRD was around 90-95% and the particle density was up to 0.97 g/cm³.

Routine tests for the disentangled nature of the polymer chains through analysis like DSC and RDA conclusively establish the material to be disentangled ultra high molecular weight polyethylene, which has been synthesized on such a large scale with highly improved process economics for the first time.

Polymerization Process Validation

The process was validated in a 2KTA plant which was producing normal UHMWPE using a Ti supported on $MgCl_2$ Ziegler-Natta catalyst.

Technical Advancement:

The process for synthesis of DUHMWPE as described in the present invention has several advantages which include:

unlike the routinely practised process carried out at zero to sub zero temperature, the synthesis of DUHMWPE in accordance with the present invention is carried out at a temperature ranging between 30° C. and 50° C.

the synthesis of DUHMWPE in accordance with the process of the present invention is carried out in a conventional UHMWPE facility thereby obviating the need for a specialized polymerization vessel for carrying out the reaction.

unlike the other reactions reported in the prior art, the process of the present invention does not end up in a messy reactor since it provides an optimal ratio of the co-catalyst/catalyst ranging between 100 to 200 for carrying out the polymerization reaction resulting in quantitative transfer of the polymer easily from the polymerization vessel.

the synthesis of DUHMWPE in accordance with the process of the present invention is faster and it also results in a polymer with good morphology.

the synthesis of DUHMWPE in accordance with the present invention is carried in a metal reactor resulting in effective heat removal. Furthermore, individual polymer molecules do not get fused with each other during the process of the present invention.

the synthesis of DUHMWPE in accordance with the present invention is simple, safe and cost-effective.

While certain embodiments have been described, these embodiments have been presented by way of example only, and are not intended to limit the scope of the invention. Variations or modifications to the design and construction of this invention, within the scope of the invention, may occur to those skilled in the art upon reviewing the disclosure herein. Such variations or modifications are well within the spirit of this invention. The accompanying claims and their equivalents are intended to cover such forms and modifications as would fall within the scope and spirit of the invention.

The numerical values mentioned for the various physical parameters, dimensions or quantities are only approximations and it is envisaged that the values higher/lower than the numerical values assigned to the parameters, dimensions or quantities fall within the scope of the invention, unless there is a statement in the specification specific to the contrary.

The invention claimed is:

1. A non-cryogenic process for synthesis of disentangled ultra high molecular weight polyethylene (DUHMWPE) having a molecular weight in the range of 0.08 million g/mole to 15 million g/mole, said process comprising the following steps:

a) mixing FI catalyst of Formula I

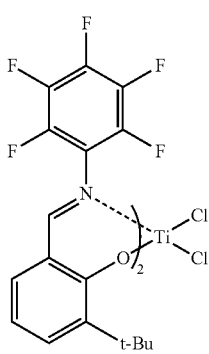

Formula I with a hydrocarbon solvent containing poly-methyl aluminoxane (P-MAO) co-catalyst, wherein the molar ratio of the amount of co-catalyst and the amount of FI catalyst is in the range of 100 to 200, in a vessel under stirring before polymerization or directly in the polymerization vessel at a temperature ranging between 25° C. and 29° C. under a dry nitrogen atmosphere; and b) introducing ethylene in the polymerization vessel to attain a pressure in the range of 1 bar to 2.5 bar and polymerizing ethylene for a predetermined time in a solution or a suspension, continuously or batch wise, in one or more stages at a temperature in the range of 30° C. to 50° C.

2. The process as claimed in claim 1, wherein the catalyst is present in a concentration range of 0.013 mmol of Ti to 0.021 mmol of Ti.

3. The process as claimed in claim 1, wherein the stirring is carried out at an agitation speed in the range of 400 rpm to 800 rpm.

4. The process as claimed in claim 1, wherein the predetermined time is in the range of 15 minutes to 20 minutes for obtaining DUHMWPE having a molecular weight of 5 million g/mole.

5. The process as claimed in claim 1, wherein the predetermined time is in the range of 55 minutes to 65 minutes for obtaining DUHMWPE having a molecular weight of greater than 12 million g/mole.

6. The process as claimed in claim 1, wherein the hydrocarbon solvent is at least one selected from the group consisting of hexane, cyclohexane, toluene, heptane, octane, iso-octane, decane, high boiling $C_8$-$C_{11}$ alkane mixture.

7. The process as claimed in claim 1, wherein the hydrocarbon solvent is a high boiling $C_8$-$C_{11}$ alkane mixture.

8. The process as claimed in claim 1, wherein the amount of the hydrocarbon solvent used in the reaction ranges between 0.45 liters and 0.55 liters.

9. The process as claimed in claim 1, wherein the polymerization is carried out in a metal reactor.

10. The process as claimed in claim 1, wherein the yield of DUHMWPE is between 0.5 kg/g and 5.0 kg/g of catalyst.

11. The process as claimed in claim 1, wherein the bulk density of DUHMWPE is between 0.055 g/cm$^3$ and 0.08 g/cm$^3$ and the particle density of DUHMWPE is up to 0.97 g/cm$^3$.

12. The process as claimed in claim 1, wherein the crystallinity of DUHMWPE as measured by XRD is in the range of 90-95%.

13. The process as claimed in claim 1, wherein the particle density of DUHMWPE is up to 0.97 g/cm$^3$.

14. The DUHMWPE synthesized by the process as claimed in claim 1, characterized by crystallinity of 90-95% as measured by XRD and a particle density up to 0.97 g/cm$^3$.

* * * * *